Feb. 15, 1955      J. W. LEE      2,701,978
FREE CENTER
Filed July 12, 1951
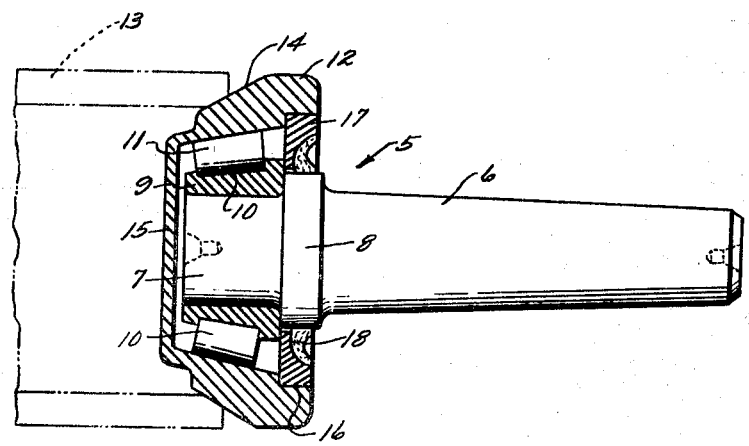
INVENTOR.
JOHN W. LEE
BY
ATTORNEY

United States Patent Office 2,701,978
Patented Feb. 15, 1955

2,701,978

FREE CENTER

John W. Lee, Dayton, Ohio

Application July 12, 1951, Serial No. 236,367

1 Claim. (Cl. 82—33)

This invention relates to a free center and more particularly to a free center for supporting a work piece having an opening in the end thereof, such as a tube.

One object of the invention is to provide such a free center in which the work engaging, or centering, element is free to rotate with the work piece supported thereby.

A further object of the invention is to provide a free center that can be operatively engaged with work pieces having end openings of various diameters, without adjustment.

A further object of the invention is to provide a free center in which a single anti-friction bearing carries both the radial load and the thrust load on the work engaging element.

A further object of the invention is to provide a free center in which the radial load is applied directly to the bearing, and the full capacity of the bearing is utilized in supporting the load.

A further object of the invention is to provide a free center in which the anti-friction bearing is supported within the load engaging element.

A further object of the invention is to provide a free center in which the inner surface of the load engaging element constitutes the outer bearing surface of the anti-friction bearing.

Other objects of the invention may appear as the device is described in detail.

The accompanying drawing is a longitudinal sectional view of a free center embodying the invention. In this drawing I have illustrated a preferred embodiment of the invention but it is to be understood that the device as a whole, as well as the several parts thereof, may take various forms without departing from the spirit of the invention.

In this embodiment of the invention the free center comprises a supporting member 5 by which it may be mounted on a lathe or other suitable supporting structure. In the form shown this supporting member comprises a tapered shank 6 having at its forward end a cylindrical portion 7, this forward portion being separated from the shank by a relatively narrow circumferential enlargement 8. The forward portion 7 of the supporting member is provided with a bearing surface and in the present instance a separate bearing member 9 is mounted on the part 7 of the supporting member and is provided with a forwardly tapered outer bearing surface. As here shown the bearing member is provided with a circumferential channel 10, the base of which is tapered forwardly and which is adapted to receive a series of anti-friction rollers 11. The supporting member 9 is rigidly held against rearward movement by contact with the enlargement 8 of the supporting member.

Mounted about the forward portion of the supporting member is a work engaging member 12, a portion of which is adapted to extend into and support a work piece having an opening in the end thereof, such as the tubular structure 13. This work engaging member 12 is rotatably supported on the anti-friction rollers 11, or other anti-friction devices, mounted on the bearing surface of the supporting member. In the present structure the work engaging member is in the nature of a hollow frustum-conical element having an inner forwardly tapered bearing surface to engage the anti-friction devices 11 and thus rotatably support the work engaging member on the supporting structure. Preferably this inner bearing surface is an integral part of the work supporting member. The work supporting member is provided with an exterior forwardly tapered surface 14 adapted to enter and have supporting engagement with work pieces having openings of various diameters. Preferably the exterior surface 14 is of an axial width approximating, or slightly exceeding, the length of the anti-friction rollers 11 and coextensive therewith, so that a load imposed upon the work engaging member at any point between the front and rear edges of that surface will be imposed directly upon the bearing. Due to the tapered bearing surface and the inclined rollers, both the radial load and the thrust load imposed upon the work engaging member is carried by the single bearing and the full capacity of the bearing is utilized in supporting the radial load. The work engaging surface of the work engaging member is located between a pair of planes passing through the ends of the anti-friction rollers and perpendicular to the axis of rotation of the work engaging member.

It is desirable that the bearing for the load engaging member should be tightly sealed against the entrance of dirt or other foreign matter. In the present instance the work engaging member is cup-shaped, the forward end thereof comprising a plate 15 integral with the conical portion thereof and completely closing the forward end of the work engaging member. The rear end portion of the frustum-conical member 14 is provided with a circumferential recess, or rabbet, 16 in which an annular member 17 is mounted, preferably with a press fit. The inner portion of this annular member extends about the enlargement 8 of the work supporting member and has sealed running connected therewith, a sealing member 18 being interposed between the member 17 and the enlargement.

While I have shown and described one embodiment of my invention I wish it to be understood that I do not desire to be limited to the details thereof as various modifications may occur to a person skilled in the art.

Having now fully described my invention what I claim as new and desire to protect by Letters Patent is:

A free center for supporting a work piece having a relatively large opening in one end thereof, said free center, comprising a supporting member having a narrow circumferential enlargement intermediate the ends thereof, said supporting member having a tapered portion extending from one end of the enlargement and a substantially cylindrical portion extending from the enlargement to the other end, a bearing member mounted upon the cylindrical portion, said bearing member being provided with a channel, a single row of antifriction rollers mounted in the channel, a rotatably mounted work engaging member having a forwardly tapered frustum-conical inner surface serving as an outer race member for the tapered anti-friction rollers that automatically permit adjustment for wear as it occurs, said work engaging member having a forwardly tapered frustum-conical exterior surface, the axial width of the frustum-conical exterior surface being approximately equal to the axial width of the anti-friction rollers, said supporting member having an annular enlargement engaging the rear end of the bearing member, and an annular sealing member mounted in and secured to the rear end portion of said work engaging member and having sealed running engagement with said enlargement of said supporting member.

References Cited in the file of this patent

UNITED STATES PATENTS

| Number | Name | Date |
|---|---|---|
| 1,491,332 | Brown | Apr. 22, 1924 |
| 1,878,690 | Forney | Sept. 20, 1932 |
| 2,016,843 | Tautz | Oct. 8, 1935 |
| 2,419,385 | Beier | Apr. 22, 1947 |

FOREIGN PATENTS

| Number | Country | Date |
|---|---|---|
| 23,950 | Great Britain | Nov. 18, 1898 |
| 889,174 | France | Jan. 3, 1944 |